Aug. 7, 1951     F. G. ALONSO     2,563,572
POULTRY TAG
Filed May 27, 1947
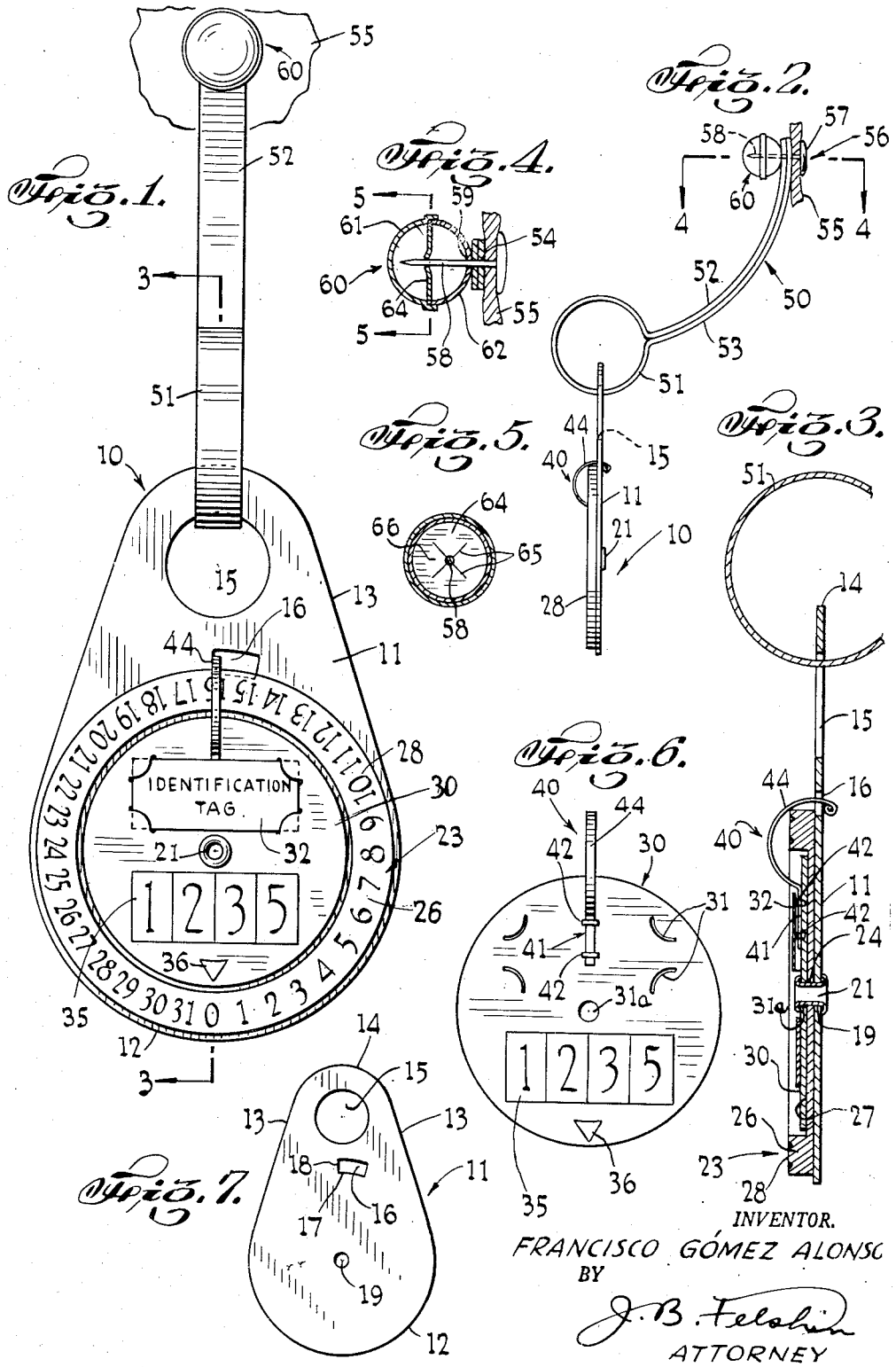
INVENTOR.
FRANCISCO GÓMEZ ALONSO
BY
J. B. Felshin
ATTORNEY Patented Aug. 7, 1951

2,563,572

UNITED STATES PATENT OFFICE 2,563,572

POULTRY TAG

Francisco Gómez Alonso, Madrid, Spain

Application May 27, 1947, Serial No. 750,825

13 Claims. (Cl. 235—122)

1

This invention relates to poultry tags. It is particularly directed to a tag which may be attached to the wing of a hen and carries data relative to the hen.

An object of this invention is to provide a tag of the character described, and means on the tag to identify the hen and being further provided with means for step by step recording the cumulative number of eggs laid by the hen per month.

Another object of this invention is to provide a tag of the character described provided with a rotary dial containing numbers 0 to 31 arranged in a circle whereby rotation of the dial will advance the numbers successively. With such construction, each time the chicken lays an egg, the dial can be adjusted one step to record the number of eggs laid by the chicken during any particular month, so that at the end of the month, the total number of eggs laid by the chickens for that particular month may be read off the tag and recorded elsewhere.

Still a further object of this invention is to provide a combination tag of the character described, provided with means for identifying the hen by number, with means for identifying the group to which the hen belongs or the year during which the record is made, and with means for recording the number of eggs laid by the hen during any month as the eggs are laid.

Yet a further object of this invention is to provide a poultry tag of the character described, having improved means for attaching the same to the wing of a hen, and which may be readily adjusted to either advance the tag the space of one number each time an egg is laid by the hen, and which may also easily be adjusted to zero point to start a new month.

Still a further object of this invention is to provide a tag of the character described, having means for both identification of the hen and keeping monthly laying records by means of a single dial which may be placed at the 32 necessary position on the dial.

Still a further object of this invention is to provide a strong, rugged and durable poultry tag of the character described, which shall be relatively inexpensive to manufacture, easy to manipulate, and which shall yet be practical and efficient to a high degree in use.

Other objects of this invention will in part be obvious, and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a front perspective view of a poultry tag embodying the invention;

Fig. 2 is a side, elevational view thereof, showing the same attached to a wing of a hen;

Fig. 3 is a cross-sectional view taken on line 3—3 of Fig. 1;

Fig. 4 is a cross-sectional view taken on line 4—4 of Fig. 2;

Fig. 5 is a cross-sectional view taken on line 5—5 of Fig. 4;

Fig. 6 is a top plan view of the front dial which carries the identification number and identification color tag; and Fig. 7 is a top plan view of the backing member.

Referring now in detail to the drawing, 10 designates a poultry tag for hens, embodying the invention. The same comprises a backing plate or member 11, which may be made of sheet aluminum, synthetic plastic material, such as methyl methacrylate or any other suitable material. The backing plate or member 11 has a semi-circular lower edge 12 from which there extends converging edges 13 interconnected by another substantially semi-circular edge 14 of smaller radius than the radius of edge 12. The plate 11 is formed with a circular opening 15, the center of which is at the radial center of the semi-circular edge 14.

Plate 11 is furthermore formed with an arcual slot or opening 16. The inner edge 17 of the opening 16 is located just within the circumference of the edge 12. One end edge 18 of opening 16 is located substantially on a line which passes through the radial centers of edges 12 and 14. The circumferential extent of the opening 16 is equivalent to somewhat more than a thirty second division of a complete circumference for the reason to be described hereinafter. The plate 11 is furthermore formed with a rivet opening 19 located at the radial center of edge 12. Extending through the pivot opening 19 is a rivet or pivot pin 21.

Mounted on plate 11 for rotation about the rivet 21 is a dial 23. Said dial 23 is formed with a central opening 24, through which the rivet 21 passes. Said dial is formed with a circular peripheral thickened forwardly projecting portion 26, thereby providing a circular central recess 27. The front surface 28 of the flange or annular thickened portion 26 is marked in some way with numbers zero to 31, equiangularly spaced apart as shown in Fig. 1 of the drawing. These numbers may either be engraved, printed, lithographed onto surface 28 or applied thereon in any other suitable manner. Member 23 may also be made of aluminum or synthetic plastic material or of any other suitable material.

Superimposed on the dial 23 and disposed within the recess 27 is a circular rotary disc 30 formed with a central hole 31a through which the rivet 21 passes. The ends of the rivet 21 are riveted over the rear of plate 11 and the front of disc 30 respectively. The disc 30 may be formed in its upper portion with four corner curved slits 31 adapted to receive the four corners of an identification tag 32. The identification tag 32 may either be a colored tag to indicate the group to which the hen to which the tag is to be attached, belongs, or may indicate the year or any other class data concerning the hen. The tag 32 may likewise be made of metal, plastic, cardboard, wood or any other suitable material. Obviously, instead of using a color tag, said tag may bear a number indicating a year or any other suitable data and is not necessarily a colored tag.

The front lower face of the disc 30 may be marked with a number 35 indicating the particular number of the hen to which the tag is to be attached. Thus, a poultry farmer may be supplied with tags which are exactly similar, except that the numbers 35 are successive numbers running perhaps from number 1 to 9999.

Below the member 35, disc 30 may be marked with an arrow 36, the lower point of which is on a line passing through the axes of openings 31a and 15.

Attached to disc 30 is a spring member 40 for the purpose hereinafter appearing. Said member 40 comprises a straight arm 41, which contacts the disc 30 along a line passing through the center of opening 31a and the center of opening 15, and is located beneath tag 32. The arm 41 may be attached to the disc 30 by means of a pair of staples 42 or in any other suitable manner. Extending from arm 41 is a curved portion 44, which curves around the top of dial 23 and passes rearwardly through opening 16, as shown particularly in Fig. 3 of the drawing and contacts edge of dial 23. Member 40 may be made of strip steel or steel spring wire. The width of member 40 is such and the opening 16 is of such angular extent that when member 40 is moved from one end of the opening 16 to the other, its angular movement is equivalent to the angle between a pair of adjacent numbers on the face 28 of the dial 23.

Means is provided for mounting the tag on the wing of a hen. To this end, there is provided a strap 50, which may likewise be made of strip aluminum or any other suitable material. The strap 50 comprises a split circular or loop portion 51 passing through the opening 15. Extending from the ends of loop 51 are contacting portions 52, 53, which may be curved longitudinally. Said strips 52, 53 are formed with registering openings 54 adjacent their outer ends. The curved arms 52, 53 may be opened up or separated somewhat so as to pass the upper portion of the tag therebetween, thereby to get the loop 51 through the opening 15.

To attach the strap 50 to the wing portion 55 of a hen, there is provided a thumb tack 56 having a head 57 and a prong 58. The prong is pierced through the skin portion of a chicken's wing between the bones and the tendon. The prong 58 passes through the registering opening 54 in arms 52, 53. Said prong 58 passes through an opening 59 in a spherical shell 60. The shell 60 may be assembled from a pair of half shells 61, 62. The shell 62 is formed with the opening 59 and it is attached to the shell 61 in any suitable manner. Within the spherical shell 60 is a disc 64 formed with a pair of crossing slits 65. The prong 58 passes through the junction of the slits 65, thereby deflecting the corners 66 formed in the disc so that the prong cannot be pulled out readily.

It will thus be seen that after the tag 10 is on the strap 50, the prong 58 is pierced through the wing portion 55 and through the opening 59 and disc 64 to keep the tag attached.

It will be noted that the dial 23 may be set at zero, as shown in Fig. 1 of the drawing, with the arrow 36 pointing towards zero at the beginning of a month. If the chicken lays one egg, the tag may be held in the hand and member 40 moved in a clockwise direction until it hits an opposite edge of opening 16, thereby bringing number 1 to a position below the arrow 36. The dial 23 may then be pressed by the fingers against backing plate 11, so that it cannot move, and member 40 is then rotated in a counterclockwise direction back to its normal position at the left end of opening 16 in contact with edge 18. The same movement may be repeated each time it is desired to advance the dial one number to indicate laying of another egg. Should the dial reach number 28 at the end of the month, the movement described above can be repeated four times to bring the tag to zero for the start of a new month.

However, should the dial only be moved to a relatively smaller number during any one month, the above described movement can be reversed to move the dial backwards toward zero. In other words, the procedure to follow is to hold the dial 23 against the backing plate 11 and move member 40 in a clockwise direction until it hits the end of the slot. Then the dial 23 is released and member 40 is moved in a counterclockwise direction to bring dial 23 back one number. Such movement is repeated until the dial comes back to zero.

It will now be understood that the improved device carries a number identifying the number of the hen and also is provided with means for serially recording the number of eggs laid by the hen during each month. The improved tag also carries additional identification to identify some group, year or other class data.

If desired, spring 40 can be made to contact an edge of dial 23 to keep said dial from accidentally turning relative to disc 30.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a tag comprising a backing plate, a dial rotatably mounted thereon and bearing numbers "0" to "31" arranged in a circle about the axis of rotation of the dial, a disc rotatably mounted on said dial about its axis of rotation, said numbers "0" to "31" being arranged on a diameter greater than the outer diameter of said disc, so as to be exposed, means on said disc pointing towards the circle of numbers on the dial, spring means on said disc to releasably engage said dial for rotating said dial together with the disc and means attached to the backing plate for attaching the same to a hen.

2. In combination, a tag adapted to be attached to a hen, and comprising a backing plate, a dial rotatably mounted thereon, numbers "0" to "31" marked on the dial and arranged in a circle about the axis of rotation of the dial, a disc rotatably mounted on said dial about its axis of rotation, said numbers "0" to "31" being arranged on a diameter greater than the outer diameter of said disc, so as to be exposed, and means on the disc pointing towards the circle of numbers on the dial, a number marked on said disc to identify the particular hen to which the tag is to be attached, said backing plate being formed with an opening disposed beyond the outer diameter of the dial and having a circumferential extent somewhat greater than the circumferential extent between adjacent numbers on the dial, and spring means on said disc releasably contacting the dial and passing through said opening for limiting movement of the disc through the angular extent between a pair of adjacent numbers on said dial.

3. In combination, a tag adapted to be attached to a hen, and comprising a backing plate, a dial rotatably mounted thereon, numbers "0" to "31" marked on the dial and arranged in a circle about the axis of rotation of the dial, a disc rotatably mounted on said dial about its axis of rotation, said numbers "0" to "31" being arranged on a diameter greater than the outer diameter of said disc, so as to be exposed, and means on the disc pointing towards the circle of numbers on the dial, a number marked on said disc to identify the particular hen to which the tag is to be attached, said backing plate being formed with an opening disposed beyond the outer diameter of the dial and having a circumferential extent somewhat greater than the circumferential extent between adjacent numbers on the dial, and spring means on said disc releasably contacting the dial and passing through said opening for limiting movement of the disc through the angular extent between a pair of adjacent members on said dial, said backing plate having an extension formed with another opening, and a strap passing through said opening and provided with means for attachment to the wing of a chicken.

4. A poultry tag adapted to be attached to the wing of a hen and comprising a backing plate, and a dial rotatably mounted thereon and carrying a circle of numbers equiangularly spaced apart, means for moving said dial through an angular extent between a pair of adjacent numbers, said means including a disc mounted for rotation relative to the dial and plate co-axial of said circle, means on the tag to identify the hen to which the tag is attached by number, and means on said tag to identify the group to which the hen to which the tag is attached belongs said last means including a colored member and means to removably mount said colored member on said disc.

5. A poultry tag adapted to be attached to a wing of a chicken comprising a backing plate, a dial rotatably mounted thereon and formed with an annular forwardly extending flange, and a recess within said flange, the front face of the flange being marked with numbers "0" to "31" equiangularly spaced apart, and a disc mounted for oscillation on the plate and disposed within said recess means to limit oscillation of the disc to an angle substantially equal to the angle between the pair of adjacent numbers about the axis of rotation of said dial, and means on the disc to rotate said dial.

6. A poultry tag adapted to be attached to a wing of a chicken comprising a backing plate, a dial rotatably mounted thereon and formed with an annular forwardly extending flange, and a recess within said flange, the front face of the flange being marked with numbers "0" to "31" equiangularly spaced apart, and a disc mounted for oscillation on the plate and disposed within said recess means to limit oscillation of the disc to an angle substantially equal to the angle between the pair of adjacent numbers about the axis of rotation of said dial, and means on the disc to rotate said dial, said disc being marked with a number identifying the hen to which the tag is to be attached, said disc being formed with four curved corner slits and a class identification tag having the corners thereof received within said disc, said disc being provided with an arrowhead opening pointing toward said flange.

7. A poultry tag adapted to be attached to a wing of a chicken comprising a backing plate, a dial rotatably mounted thereon and formed with an annular forwardly extending flange, and a recess within said flange, the front face of the flange being marked with numbers "0" to "31" equi-angularly spaced apart, and a disc mounted for oscillation on said plate and disposed within said recess, said disc being marked with a number identifying the hen to which the tag is to be attached said disc being formed with four curved corner slits and a class identification tag having the corners thereof received within said disc, said disc being provided with an arrowhead opening pointing toward said flange, and with means to move said dial including a member attached to said disc for movement therewith, and means on the backing plate to limit movement of said member through a circumferential angle between a pair of adjacent numbers on the dial flange.

8. A poultry tag comprising a backing plate, a dial rotatably mounted on the backing plate and marked with equi-angularly spaced successive numbers arranged circularly, a disc mounted for rotation about the axis of rotation of the dial, said dial being disposed between the disc and the backing plate and having a greater diameter than the disc, and spring means fixed to the disc and releasably contacting the dial, said backing plate having a slot disposed beyond the dial and having an angular extent substantially equal to the angle between adjacent numbers, through which the spring projects for limiting angular movement of the disc relative to the backing plate.

9. A poultry tag comprising a backing plate, a dial rotatably mounted on the backing plate and marked with equi-angularly spaced successive numbers arranged circularly, a disc mounted for rotation about the axis of rotation of the dial, said dial being disposed between the disc and the backing plate and having a greater diameter than the disc, and spring means fixed to the disc and releasably contacting the dial, said backing plate having a slot disposed beyond the dial and having an angular extent substantially equal to the angle between adjacent numbers, through which the spring projects for limiting angular movement of the disc relative to the backing plate, said disc carrying a number to identify a particular chicken, and a pointer on the disc pointing toward the circle of numbers on the dial.

10. A poultry tag comprising a backing plate, a dial rotatably mounted on the backing plate and marked with equi-angularly spaced successive numbers arranged circularly, a disc mounted for rotation about the axis of rotation of the dial, said dial being disposed between the disc and the backing plate and having a greater diameter than the disc, and spring means fixed to the disc and releasably contacting the dial, said backing plate having a slot through which the spring projects for limiting angular movement of the disc relative to the backing plate, said disc carrying a number to identify a particular chicken, and a pointer on the disc pointing toward the circle of numbers on the dial, the angular extent of the slot in the backing plate being similar to the angular extent between a pair of successive numbers on the dial.

11. A poultry tag comprising a backing plate, a strap attached to the backing plate, means attached to the strap and adapted to pierce the hen's wing for connecting the tag to the hen, a dial rotatably mounted on the backing plate for rotation about the axis of the dial, a circle of numbers equi-angularly spaced apart and marked on the dial, and means mounted for oscillation on the backing plate for moving said dial through an angular extent between a pair of adjacent numbers and means to limit movement of the oscillatory means to the angle substantially equal to the angle between the pair of adjacent numbers.

12. A poultry tag comprising a backing plate, a circular dial mounted on the backing plate for rotation about the axis of said dial, said dial having an annular central recess, a circular disc within said recess and mounted for rotation relative to the axis of said dial and relative to said backing plate, said dial having an annular peripheral raised flange surrounding said recess, said flange having equi-angularly spaced successive numbers marked thereon, said backing plate being formed with a slot disposed beyond said dial and having an angular extent equal to the angle between a pair of adjacent numbers, and a spring fixed to said disc and contacting said dial and having a portion projecting into said slot.

13. A poultry tag comprising a backing plate, a circular dial mounted on the backing plate for rotation about the axis of said dial, said dial having an annular central recess, a circular disc within said recess and mounted for rotation relative to the axis of said dial and relative to said backing plate, said dial having an annular peripheral raised flange surrounding said recess, said flange having equi-angularly spaced successive numbers marked thereon, said backing plate being formed with a slot disposed beyond said dial and having an angular extent equal to the angle between a pair of adjacent numbers, a spring fixed to said disc and contacting said dial and having a portion projecting into said slot, said backing plate having a radial extension formed with an opening, and a strap passing through the opening in the plate.

FRANCISCO GÓMEZ ALONSO.

REFERENCES CITED

The following references are of record in the file of this patent:

UNITED STATES PATENTS

| Number | Name | Date |
|---|---|---|
| 122,994 | Cottle | Jan. 23, 1872 |
| 482,961 | Gilbert | Sept. 20, 1892 |
| 692,906 | Rennie et al. | Feb. 11, 1902 |
| 1,460,842 | Brooks | July 3, 1923 |
| 1,461,449 | Mathieson | July 10, 1923 |
| 1,468,862 | Hollindrake | Sept. 25, 1923 |
| 1,497,094 | Dremel | June 10, 1924 |
| 1,668,704 | Turrentine | May 8, 1928 |
| 1,885,072 | Bechtold | Oct. 25, 1932 |
| 2,065,424 | Brubaker | Dec. 22, 1936 |

FOREIGN PATENTS

| Number | Country | Date |
|---|---|---|
| 18,209 | Great Britain | Dec. 17, 1908 |
| 24,231 | Holland | Mar. 17, 1931 |
| 153,342 | Germany | May 10, 1938 |
| 520,030 | Germany | Mar. 6, 1931 |